(12) United States Patent
Hu

(10) Patent No.: US 11,321,967 B2
(45) Date of Patent: May 3, 2022

(54) MOTION CAPTURE DEVICE AND METHOD FOR THE MULTI-POINT RECEIVING ARRAY BASED ON THE NON-PROPAGATING ELECTROMAGNETIC FIELD

(71) Applicant: Chengdu Siwuge Technology Co., Ltd., Chengdu (CN)

(72) Inventor: Xiao Hu, Tianfu Chengdu Sichuan (CN)

(73) Assignee: CHENGDU SIWUIGE TECHNOLOGY CO., LTD.

( * ) Notice: Subject to any disclaimer, the term of this patent is extended or adjusted under 35 U.S.C. 154(b) by 491 days.

(21) Appl. No.: 16/427,030

(22) Filed: May 30, 2019

(65) Prior Publication Data
US 2020/0250409 A1    Aug. 6, 2020

(30) Foreign Application Priority Data
Feb. 1, 2019 (CN) .......................... 201910104638.2

(51) Int. Cl.
*G01S 5/02* (2010.01)
*G06V 40/20* (2022.01)
*H01Q 1/27* (2006.01)
*H04B 5/02* (2006.01)
*G06K 9/62* (2022.01)
*H04B 1/3827* (2015.01)

(52) U.S. Cl.
CPC ............ *G06V 40/28* (2022.01); *G01S 5/0221* (2013.01); *G01S 5/0226* (2013.01); *G01S 5/0278* (2013.01); *G06K 9/6232* (2013.01); *G06K 9/6256* (2013.01); *H01Q 1/273* (2013.01); *H04B 1/385* (2013.01); *H04B 5/02* (2013.01); *H04B 2001/3861* (2013.01)

(58) Field of Classification Search
CPC ............ G06K 9/02355; G01S 5/02213; G01S 5/0226; G01S 5/0284
USPC ......................................................... 342/451
See application file for complete search history.

(56) References Cited

U.S. PATENT DOCUMENTS 7,787,951 B1 * 8/2010 Min ....................... A61B 5/316
                                                   607/17
D799,487 S    10/2017 Nishizawa
(Continued)

FOREIGN PATENT DOCUMENTS

CN       105354532 A  *  2/2016
CN       108629272 A  *  10/2018

*Primary Examiner* — Harry K Liu
(74) *Attorney, Agent, or Firm* — Messner Reeves LLP

(57) ABSTRACT

The present invention discloses a method and system for obtaining and tracking motions and gestures of a body part (e.g. a hand) of a user, by using antennas worn on the body (e.g. on a wrist band). The antennas may be near-field antennas which transmit and receive short-range electromagnetic fields. The electromagnetic fields may be modified by interaction with the body part, depending on the exact position of the body part. The modified electromagnetic field may be received by the antennas. The received signal may be processed, to provide additional spatial information (e.g. beamforming). The processed signal may be interpreted by pattern recognition (e.g. neural network, database table). The pattern recognition may be trained using labeled pair data (e.g. known hand positions and corresponding processed signals).

14 Claims, 8 Drawing Sheets

(56) References Cited

U.S. PATENT DOCUMENTS

| | | | |
|---|---|---|---|
| 10,324,494 | B2 | 6/2019 | Camacho Perez et al. |
| 2005/0046608 | A1 | 3/2005 | Schanz et al. |
| 2015/0363001 | A1* | 12/2015 | Malzbender .......... G06F 40/274 706/18 |
| 2016/0377704 | A1 | 12/2016 | Harash et al. |
| 2016/0379475 | A1 | 12/2016 | Zack et al. |
| 2017/0082741 | A1 | 3/2017 | Adib et al. |
| 2017/0161555 | A1* | 6/2017 | Kumar ................. G06K 9/4628 |
| 2017/0205502 | A1 | 7/2017 | Honma et al. |
| 2018/0217248 | A1 | 8/2018 | Nakayama et al. |
| 2018/0239436 | A1* | 8/2018 | Wei ........................... G06T 7/50 |
| 2018/0253151 | A1 | 9/2018 | Kletsov et al. |
| 2018/0353766 | A1* | 12/2018 | Casse ................... A61B 5/4836 |
| 2018/0364811 | A1 | 12/2018 | Kar et al. |
| 2019/0141666 | A1 | 5/2019 | Luo et al. |
| 2021/0240972 | A1* | 8/2021 | Austin ............... G06K 9/00791 |

\* cited by examiner

Processor

600

Subdivision database

602a  Gesture A

| | Inputs 604a | | | Outputs 606a | | |
|---|---|---|---|---|---|---|
| | Beam 1 | Beam 2 | Beam N | Digit 1, x | Digit 1, y | Digit N, x |
| 608a | | | | | | |
| 608b | | | | | | |
| 608c | | | | | | |

602b  Gesture B

| | Inputs 604b | | Outputs 606b | |
|---|---|---|---|---|
| | Beam 1 | Beam 2 | Finger 1, x | Finger 1, y |
| 608d | | | | |
| 608e | | | | |
| 608f | | | | |

MOTION CAPTURE DEVICE AND METHOD FOR THE MULTI-POINT RECEIVING ARRAY BASED ON THE NON-PROPAGATING ELECTROMAGNETIC FIELD

BACKGROUND

The present invention claims priority to pending Chinese Application No. 2019101046382, filed Feb. 1, 2019, and incorporated herein by reference.

At present, human hand motion and gesture capture technology includes the following categories: 1. optical cameras; 2. inertial sensors; 3. external low-frequency electromagnetic field (EMF) systems; 4. millimeter wave (e.g. 60 GHz) wearable electromagnetic field systems; 5. wearable electromagnetic field motion capture gloves. These technologies all have certain shortcomings, and the corresponding disadvantages are as follows. 1. Optical: no light interference or light blocking is allowed, and the arm of the user must be lifted up toward the camera. 2. Inertial: the accuracy drifts with time, so it cannot be used for a long time without recalibration. It is necessary to wear bulky gloves, making daily use inconvenient. 3. External EMF: it must be used within the action distance of the external antenna system, it is very susceptible to interference, and the cost is very high. 4. External millimeter wave: this is similar other external EMF (e.g. category 3)—the cost is very high, and it is susceptible in interference by any metal or medium within the range of action. 5. Wearable EMF gloves: the gloves are bulky, making them inconvenient to wear and use. Based on this current situation, a wearable motion capture device is proposed. This device eliminates the need for bulky gloves and also does not require clear optical view. It is within this context that embodiments of the present invention arise.

BRIEF SUMMARY

The present invention provides systems and methods comprising one or more devices configured to track motion of a hand or body of a user.

In an embodiment, a hand motion tracking device comprises a band configured to attach to a human wrist, a plurality of near-field antennas disposed on the band, and a control unit electrically connected to the antennas. The control unit comprises a switch, a processor, a transmitting module, a receiving module, and a wireless communication module. The switch is configured to selectively connect each near-field antenna of the plurality near-field antennas to a selected one of the transmitting module and the receiving module. The processor is configured to execute instructions for controlling the switch to connect a first subset of the plurality of near-field antennas to the transmitting module and a second subset of the plurality of near-field antennas to the receiving module; for transmitting, from the transmitting module, transmitted RF signals, wherein the transmitted RF signals are delivered to the first subset of the plurality of near-field antennas; for receiving, from the receiving module, received RF signals from the second subset of the plurality of near-field antenna, wherein the received RF signals are associated with a frequency, an amplitude, and a phase information; for digitizing the frequency, the amplitude, and the phase information of the received RF signals; for applying the digitized frequency, amplitude, and phase information to a neural network to estimate a hand gesture wherein the hand gesture comprises an arrangement of a palm and fingers; for applying the digitized frequency, amplitude, and phase information and the estimated hand gesture to a finger position database to determine an estimated position of one or more fingers; for comparing the estimated finger position with one or more previous estimated finger positions to determine an estimated finger velocity; and for sending the estimated hand gesture, the estimated finger position, and the estimated finger velocity to the wireless communication module for transmission.

In an embodiment, a motion tracking device comprises a band configured to attach to a human body, a plurality of near-field antennas disposed on the band, and a control unit, electrically connected to the antennas. The control unit comprises a switch, a processor, a transmitting module, a receiving module, and a wireless communication module. The switch is configured to connect each antenna of the plurality near-field antennas to a selected one of the transmitting module and the receiving module. The processor is configured to execute instructions for controlling the switch to connect a first subset of one or more of the antennas to the transmitting module and a second subset of one or more of the antennas to the receiving module; for transmitting, from the transmitting module, a one or more transmitted RF signals, wherein the transmitted RF signals are delivered to the first subset of antennas, such that the first subset of antennas emits a near-field electromagnetic field (EMF) which is configured to interact with a body part; for receiving, from the receiving module, a one or more received RF signals, wherein the received RF signals comprise a frequency, amplitude, and phase information from the second subset of antennas such that the second subset of antennas senses the EMF; for digitizing the frequency, amplitude, and phase information of the received RF signals; for applying the digitized frequency, amplitude, and phase information to a pattern recognition system to determine an estimated arrangement of a body part; for sending the estimated arrangement of the body part to the wireless communication module for transmission.

In an embodiment, a motion tracking method comprises controlling a switch to connect a first subset of one or more antennas to a transmitting module and a second subset of one or more antennas to a receiving module; transmitting, from the first subset of antennas, a near-field electromagnetic field (EMF) which is configured to interact with a hand of a user; receiving, from the second subset of antennas, an EMF signal; digitizing the EMF signal; processing the digitized EMF signal, by beamforming, to produce a beam signal; applying the beam signal to a pattern recognition system to determine an estimated arrangement of the hand; and sending the estimated arrangement of the hand to a wireless communication module for transmission.

BRIEF DESCRIPTION OF THE DRAWINGS

The present invention will become more readily apparent to those ordinarily skilled in the art after reviewing the following detailed description and accompanying drawings, in which:

FIG. 6 is a schematic diagram of a subdivision table component of a device for tracking motion of a human hand of in accordance with an embodiment of the present invention.

DETAILED DESCRIPTION

Figure 1:
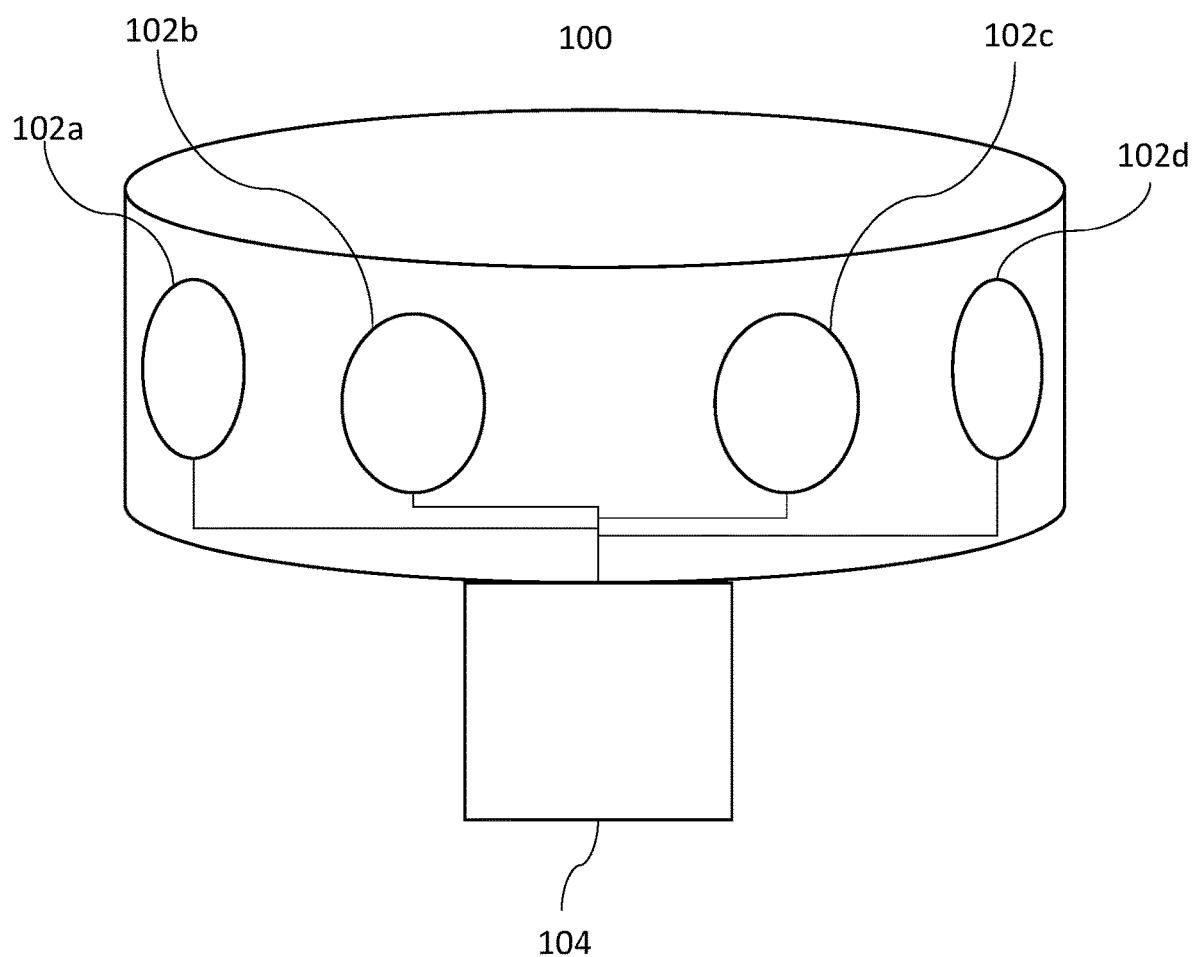
FIG. 1 is a front-perspective view of an illustrative device for tracking motion of a human hand of in accordance with an embodiment of the present invention.

The present invention will now be described more specifically with reference to the following embodiments. It should be noted that the following descriptions of preferred embodiments of this invention are presented herein for purpose of illustration and description only. It is not intended to be exhaustive or to be limited to the precise form disclosed.

Herein, the terms "gesture", "motion", and "position" are defined as follows. "Gesture" refers to a substantially approximate or general arrangement of a hand or body of a user (e.g. fully closed fist, fully open hand, closed fist with pointed index finger, etc.). "Position" refers to a substantially precise arrangement of a hand or body of a user (e.g. angles of all hand joints, coordinates of all fingertip locations and palm location, etc.). If one knows a "position" of a hand or body then one can infer a corresponding "gesture"; the reverse is not true. "Motion" refers to "position" over time, and also may include "gesture" information as a subset of "position" information.

In view of the above mentioned problems in the existing technologies, a motion capture device and method is provided. This device and method may use a multi-point antenna array to transmit and receive a non-propagating electromagnetic field (EMF). This method may be applied by a simple wearable structure (e.g. a wristband). Bulky gloves are not needed for the motion capture process, which may enhance the ease of use and comfort of motion capture. At the same time, the method may be environmentally adaptable, e.g. resistant to interferences by nearby lights or metal. Lastly, the method may give users a high-precision motion capture experience that may be used without the frequent recalibration that is required for inertial motion capture systems.

In an embodiment, a motion capture method may be comprised of the following steps. Note that these steps are not to be construed as necessarily occurring in the given order over time. Step A: Establish a specific frequency EMF distribution around the hand of the user, wherein the EMF distribution may be varied over time. Step B: Optionally, repeat step A to establish a plurality of EMF distributions at different positions around the hand, at a single frequency or at multiple frequencies, to form a superimposed EMF distribution. Step C. While the hand makes different motions, collect the amplitude information and phase information of the EMF over time. Step D: Repeat step C to collect amplitude information and phase information of the field strength at different positions around the hand. Step E: Perform digital beamforming processing using the amplitude information and phase information of the field strength collected at different positions through multi-antenna multi-channel digital acquisition to get EMF information in different directions; perform pattern recognition calculation; determine the gesture states corresponding to the hand motions.

Regarding step A, an EMF distribution in may be generated by a radiator fixed around the hand. A range of action of the EMF distribution generated in step A may be 20 cm. Regarding step C, amplitude information and phase information of the field strength may be collected by a receiver fixed around the hand.

Regarding step E, a pattern recognition calculation may be performed by a neural network. A neural network may be constructed (e.g. trained) using a deep learning method (e.g. backpropagation (BP)), using field strength information (e.g. as calculated by beamforming) as a basis for assisted learning. A neural network may be trained to recognize gesture patterns through training with a large number of samples.

Following step E, a step F may be further performed. After determining a gesture state, a subdivision database may be accessed. The subdivision database may be accessed in a specific subdivision corresponding to a gesture state. The subdivision database may contain a mapping relationship between field strength information and finger position within a gesture state. The subdivision database may be queried to find a finger or body position and, optionally, finger or body speed.

A motion capture device may use an EMF within a non-propagating field range. A range of a non-propagating EMF may be extremely short (e.g. on the order of 20 cm), beyond this range a non-propagating EMF may abruptly attenuate. A short EMF range may allow a motion capture device to have reduced interference from the surrounding environment. A motion capture device may measure disturbance of a non-propagating EMF.

A motion capture device may utilize a plurality of radiators to generate a plurality of EMFs which may be superimposed. Different radiators of the plurality of radiators may emit EMF at the same frequency or at different frequencies.

A user's hand may be surrounded by an EMF formed by a single radiator or a plurality of radiators. As a user's hand makes different motions, a plurality of receivers may simultaneously receive the amplitude and phase information of an EMF as the EMF changes over time. Amplitude information and phase information from an EMF collected over different hand positions may be interpreted by a pattern recognition calculation, so as to determine an estimate of a hand position state from an EMF.

Through the amplitude and phase information received by multiple receivers, digital beamforming and pattern recognition calculations may be performed on a multi-channel signal to determine a gesture state. Pattern recognition calculations may consider current states and past states (e.g. motion trajectories).

In addition to providing information such as gesture, finger position, and finger velocity, the motion tracking device may provide information including palm position and palm velocity.

FIG. 1 shows an example embodiment of a near-field RF motion tracking device. The device may be supported on a wearable band 100 (e.g. a bracelet or wristband) which may be worn by a user (e.g. on the wrist). On the band, multiple antennas 102 may be placed. These antennas 102 may be on the outer surface of the band 100 or may be embedded inside. Each antenna 102 may be electrically connected to the control unit 104. The control unit 104 may also be attached to the wearable band 100. The control unit 104 includes a housing and circuitry to operate the antennas 102. The wearable band 100 may alternately be any form of wearable or body-attachable mounting.

Figure 2:
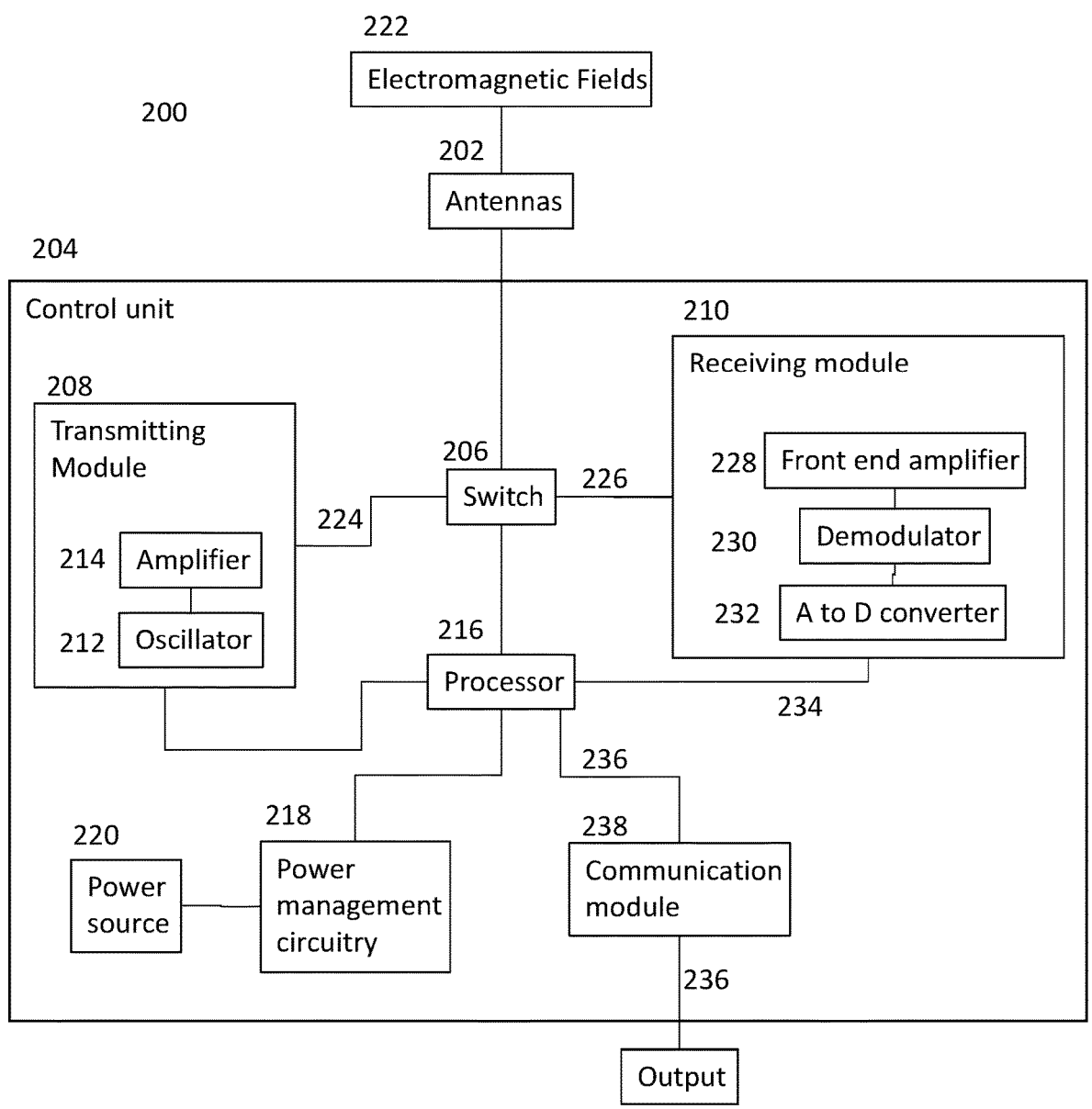
FIG. 2 is a schematic diagram of a hardware composition of a device for tracking motion of a human hand of in accordance with an embodiment of the present invention.

FIG. 2 shows a block diagram of an example embodiment of a near-field RF motion tracking device 200. Each of the antennas 202 may be electrically connected to the control unit 204. Within the control unit 204, the antennas 202 may be attached to an RF switch 206. The RF switch 206 may serve to controllably connect each antenna 202 to one of either a transmitting module 208 or a receiving module 210. When an antenna 202 is connected to the transmitting module 208, the antenna 202 may become a transmitting (radiating) antenna, generating an EMF 222 around the antenna 202 from the transmitted RF electrical signal 224. When an antenna 202 is connected to the receiving module, the antenna 202 may become a receiving antenna, picking up the EMF 222 around the antenna 202 and converting it into received RF electrical signals 226.

The antennas 202 may be near-field antennas. Near-field antennas are not designed to transmit or receive long-range electromagnetic waves, but only to transmit or receive in the near field. Near-field EMF is only present within a few wavelengths of a transmitting source. One example of a near-field antenna is an electromagnetically short antenna, wherein the longest dimension of the antenna is substantially shorter than the wavelength of the RF frequency at which the antenna is transmitting or receiving. The antennas 202 may be loop antennas, dipole antennas, patch antennas, or any other antenna configuration suitable for near field transmission and receiving. The antennas 202 comprise two or more antennas, with at least one transmitting antenna and at least one receiving antenna active during a motion capture process. The antennas may 202 transmit and receive an EMF 222, and the antennas 202 may be configured to have a pattern of transmitted or received EMF 222 that interacts with the hand of the user. A motion capture device may utilize a one or a number of small volume (small electrical length) radiators to generate an EMF distribution of a specific frequency or set of frequencies around a hand of a user. An EMF may be time-varying as a user moves their hand over time. Over a short time, an EMF may be considered steady-state like if variation due to motion is substantially low across the short time.

The transmitting module 208 may include an oscillator 212 (e.g. phase-lock loop, crystal oscillator, voltage-controlled oscillator, etc.) which initially generates one or more electrical RF signals having a particular frequency or set of frequencies. The transmitting module 208 may include an amplifier 214 which amplifies an RF signal to produce a transmitted RF electrical signal 224 with a particular amplitude and power for transmission. One or more outputs of the transmitting module 208 may be connected to the switch 206, which may controllably connect the one or more outputs of the transmitting module 208 to one or more antennas 202. The transmitting module 208 may be electrically connected to the processor 216. The processor 216 may send controlling instructions to the transmitting module 208, which may control the one or more transmitted RF electrical signals 224 (e.g. on/off, frequency, amplitude, phase, etc.). The transmitting module 208 may send feedback signals to the processor 216. The transmitting module 208 may be connected to power management circuitry 218, and may thereby be connected to a power source 220 to provide power for the transmitting module 208.

The receiving module 210 may be configured to pick up and process the received RF electrical signals 226 from one or more antennas 202. The receiving module 210 may include a front-end amplifier 228 to apply gain to the one or more received RF electrical signals 226. The receiving module 210 may include demodulating circuitry 230 (e.g. superheterodyne receiver, super-regenerative receiver, etc.), which may be configured to convert the received RF electrical signal 226 into a lower frequency signal (e.g. baseband, intermediate frequency, etc.) to facilitate further processing, while preserving the amplitude and phase information of the RF electrical signal 226. The demodulating circuitry 230 may include a connection to the transmitting module 208, which may provide a reference signal for demodulation. The receiving module 210 may include an analog-to-digital converter 232, which may convert the amplitude and phase information from the received RF electrical signal 226 into a digital signal containing the same amplitude and phase information 234.

The receiving module 210 may be electrically connected to the processor 216. The receiving module 210 may send amplitude and phase information 234 to the processor 216. This amplitude and phase information 234 may be digital or analog. The processor may send instructions to control the receiving module 208 (e.g. on/off, gain, bit rate, etc.). The processor may be configured to process the amplitude and phase information 234 to produce output information 236 (e.g. gesture, finger position, and finger velocity of a hand of a user).

The processor 216 may be connected to a communication module 238. The communication module 238 may be a wired or wireless communication module (e.g. wireless personal area network (WPAN) module). The communication module 238 may receive output information 236 and from the processor 216, and may receive instructions from the processor 216 (e.g. on/off, timing, etc.). The communications module 238 may send output information 236 to other wearable or non-wearable components of the motion tracking system (e.g. computer, smartphone, base station), to perform later functions with the output information 236 (e.g. processing, storage, display). The communications module 238 may receive instructions or information from other components of the motion-tracking system. The communication module 238 may send instructions or information to the processor 216.

Figure 3:
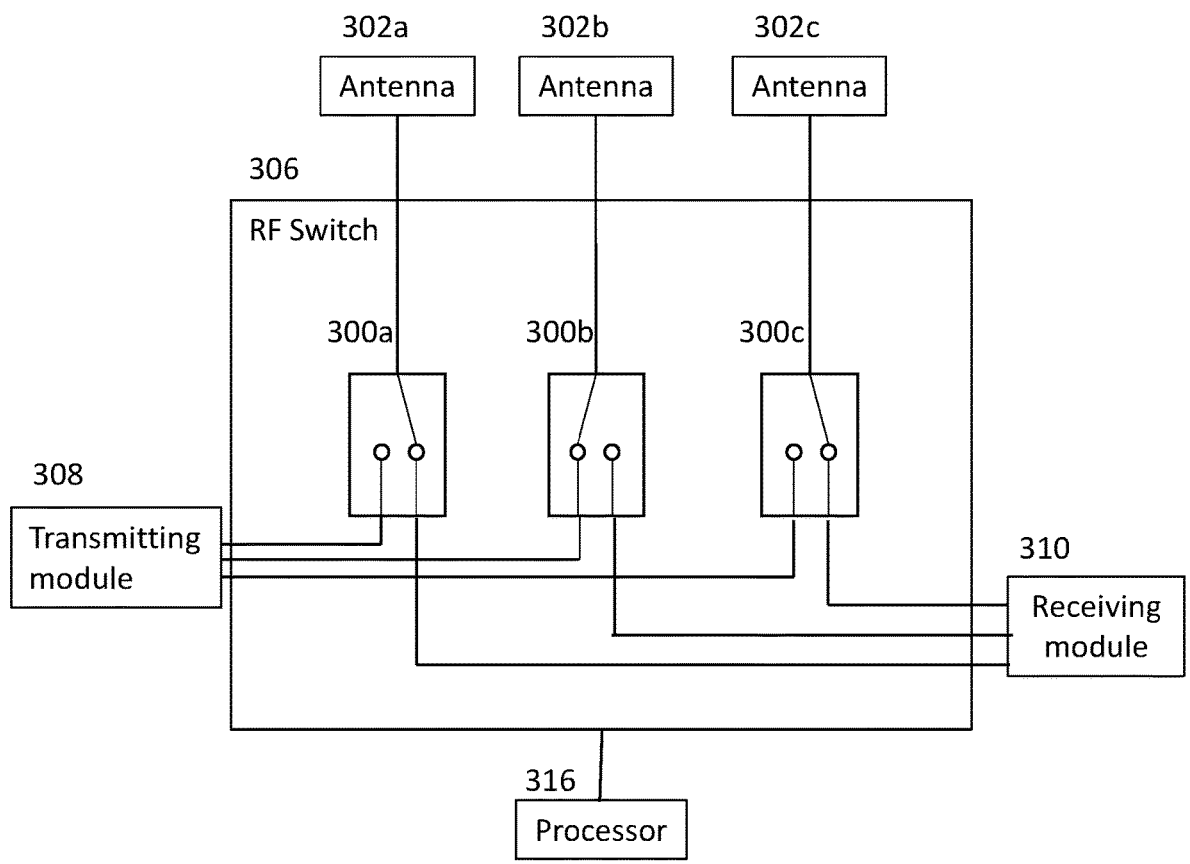
FIG. 3 is a schematic diagram of a hardware composition of an antenna switch component of a device for tracking motion of a human hand of in accordance with an embodiment of the present invention.

FIG. 3 shows a block diagram of the internal connections of an RF switch 306. The RF switch 306 contains one or more switching elements 300, each of which may serve to controllably connect one or more respective antennas 302 to one of a transmitting module 308 or a receiving module 310. The switch states of the switching elements 300 may be controlled by input from a processor 316.

The antenna 302 connections may be controlled according to several different embodiments. At a given time, each antenna (e.g. 302*a*, 302*b*, 302*c*) may be in one of a transmitting state or a receiving state. During a motion tracking operation, at least one antenna must be transmitting (e.g. 302*b*) and at least one antenna must be receiving (e.g. 302*a* and 302*c*) in order for a signal to be created. In one embodiment, a single antenna 302 may transmit while all other antennas 302 receive. An advantage of this embodiment may be that the maximum possible number of receiving antennas 302 are active, thereby providing the maximum amount of information about the EMF and its interaction with the user's body. In an alternate embodiment, half the antennas 302 may transmit while the other half of the antennas 302 receive. The spatial arrangement of the transmitting and receiving antennas 302 may be alternating, such that each transmitting antenna (e.g. 302b) is adjacent to two receiving antennas (e.g. 302a and 302c). An advantage of this alternate embodiment may be that all receiving antennas may receive strong EMF signals. The antenna connections may be modified over time by the RF switch 306 according to instructions from the processor 316.

Figure 4:
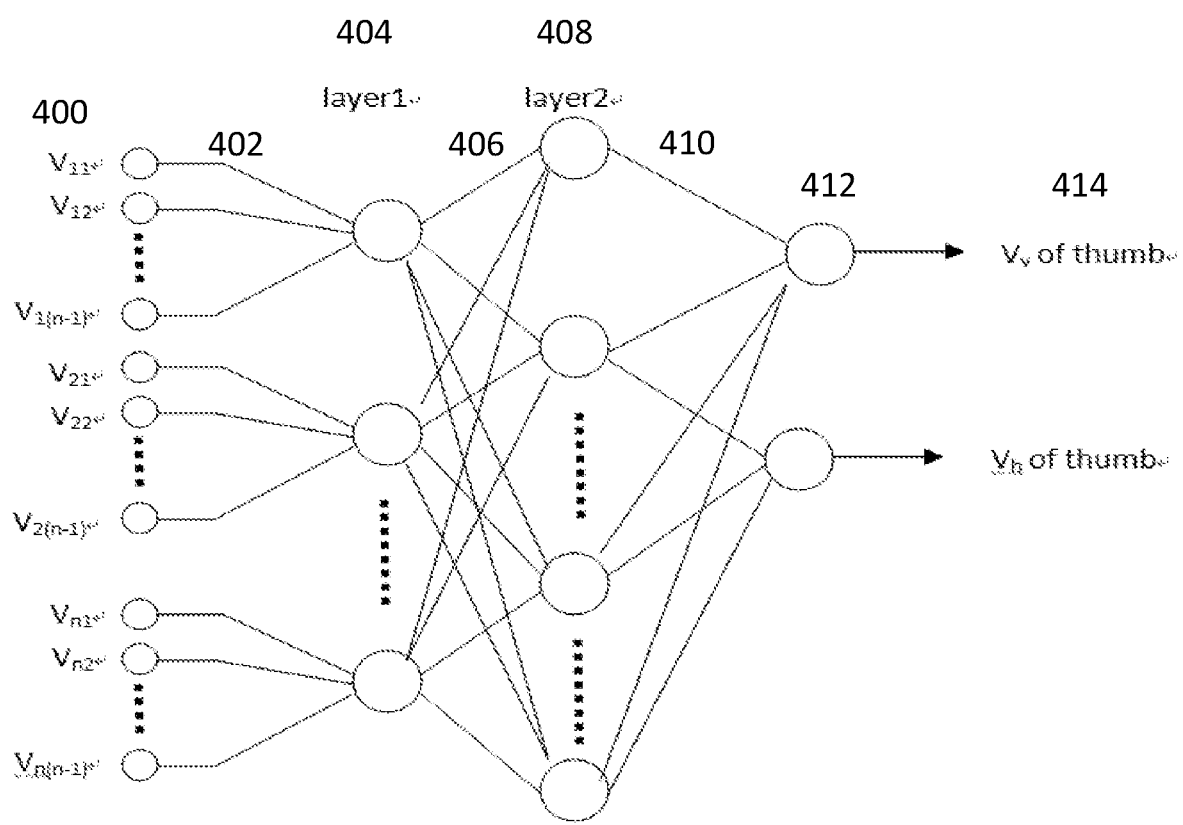
FIG. 4 is a schematic diagram of a gesture recognition neural network component of a device for tracking motion of a human hand of in accordance with an embodiment of the present invention.

FIG. 4 depicts an example of a neural network architecture. A neural network may be comprised of elements referred to as neurons (depicted here as circles). Each neuron may receive one or more inputs, and may produce an output. Each input to a neuron may have a corresponding "weight", which corresponds to the strength of that input's influence on the neuron. A neuron's overall activation may be the sum of all its inputs, with each input scaled by its corresponding weight. A neuron may pass a sum of weighted inputs through an activation function, to determine the neuron's output (e.g. a sigmoid function, a threshold step function). The unidirectional connections (depicted here as lines) between neurons are referred to as "synapses" with the output of a pre-synaptic neuron becoming the input of a post-synaptic neuron. Each synapse has a "weight" which determines a pre-synaptic neuron's influence on the post-synaptic neuron: a high weight means that the pre-synaptic neuron can easily cause the post-synaptic neuron to fire; a low weight synapse mean that the pre-synaptic neuron has only a weak influence on the post-synaptic neuron.

In this example network, input signals 400 are applied as inputs to a first layer of neurons 404. Each connecting line 402 may be considered as a synapse, having a synaptic weight which determines the connection strength (e.g. by multiplying the input to the post-synaptic neuron). Each connecting line 402 comprises a one-way connection, such that information is passed from left to right through the network. In the first layer 404, each neuron (circle) adds up the sum of all inputs (as weighted by the synaptic weight of each connection), and passes this sum through an activation function. Each neuron in the first layer 404 then sends an output to the neurons in the second layer 408, with the output scaled by the weight of the corresponding connection 406. The second layer of neurons 408 then may perform a similar process of summing weighted inputs and passing through an activation function. The output of the second layer of neurons 408 may then be sent to a final output layer 412 by corresponding synaptic connections 410. The output layer 412 may perform a final process of summing weighted inputs and passing through an activation function. In an example, a network may receive a range of voltage inputs 400 as inputs, and produce a finger position as a final output 414.

Such a neural network may be trained by a backpropagation process. Backpropagation refers to a backward propagation of errors. An error may be calculated by applying network inputs (e.g. inputs 400) to produce network outputs (e.g. output 414), then comparing the network outputs to pre-determined "correct" output values corresponding to the network inputs. The difference between the network outputs and the correct outputs may be considered as an error. This error may then be used to modify synaptic weights throughout the network. Backward propagation (e.g. by a chain rule process) may provide a means to determine how each synapse of the network should be modified, such that if the same network inputs were applied again the network output would have a smaller error than before the synapses were modified.

Figure 5:
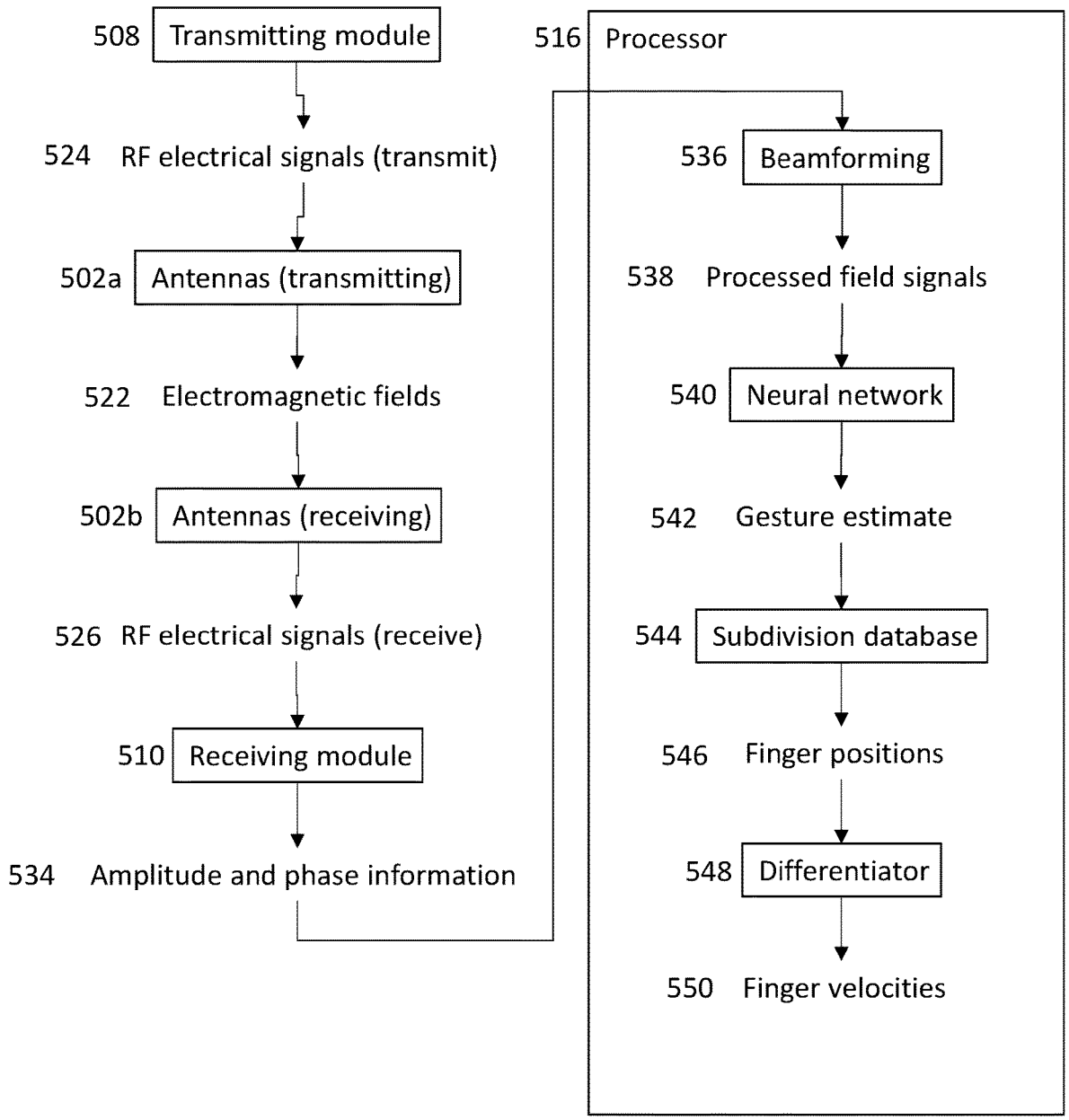
FIG. 5 is an illustrative process flow for a method by which a device may track motion of a human hand by near-field electromagnetic fields of in accordance with an embodiment of the present invention.

FIG. 5 details the operation of a motion tracking device. A transmitting module 508 may produce transmitted RF electrical signals 524, which may be routed to a selected subset of one or more antennas 502a, herein referred to as the transmitting antennas 502a. The selection of the subset of antennas 502a from within the plurality of antennas 502 may be based on instructions from the processor 516. The transmitting antennas 502a may convert the transmitted RF electrical signals 524 into a near-field EMF 522. This EMF 522 may interact with a hand or other body part of a user; this interaction may alter aspects of the EMF (amplitude, phase, spatial distribution, etc.). The EMF 522 may then be sensed by a subset of antennas 502b, herein referred to as the receiving antennas 502b. The receiving antennas 502b may convert the EMF 522 into received RF electrical signals 526, which may be passed to the receiving module 510. The receiving module 510 may perform preliminary processing of the received RF electrical signals 526, which may include any of amplification, demodulation, and analog-to-digital conversion. During any processing, the receiving module 510 may process the received RF electrical signals 526 to yield its amplitude and phase information 534. Each individual antenna of the receiving antennas 502b may sense a particular spatial element of the EMF 522, and thereby may produce a particular received RF electrical signal 526 which may be converted to particular amplitude and phase information 534. The amplitude and phase information 534 is passed to the processor 516.

The processor 516 may perform several successive operations on the amplitude and phase information 534. One operation may include beamforming 536. Beamforming 536 may be performed with digital or analog signals. Beamforming of received signals is a means to extract directional information from signals received by two or more antennas, by using phase delays and amplitude scaling of the received signals. Multiple beamforming processes 536 may be performed on a single set of received signals (e.g. 534), producing multiple forms of directional information.

In addition to or instead of beamforming, the processor 516 may perform other one or more operations on the amplitude and phase information 534. Such operations may generally be considered feature extraction. Feature extraction methods are widely used in machine learning and pattern recognition to distill an initial signal into a more information-rich signal with less redundant information.

By means of the one or more feature extraction operations (e.g. beamforming 536), the amplitude and phase information 534 may be converted into processed field signals 538. The processed field signals 538 may be passed into a neural network 540, which may interpret and classify the processed field signals 538 as corresponding to a gesture 542. The processed field signals 538 may be interpreted according to the synaptic weights of a neural network 540.

After the neural network 540 has produced an estimate of the gesture 542, the gesture 542 and the processed field signals 538 may be further interpreted together according to the subdivision database 544. The subdivision database 544 may contain a mapping or lookup table, divided according to the recognized gestures 542. For each gesture 542, the subdivision database 544 may map the processed field signals 538 onto a finger position 546. The term "finger position" may refer to the position of all fingers and thumb of a hand of a user. The term "finger position" may also refer to the arrangement of any motion-tracking object of interest (e.g. foot position, face position, arm position, body position). Output may include gesture 542, positions 546, and velocities 550.

As depicted in FIG. 6, the subdivision database 600 may contain multiple tables 602, each corresponding to a general state (e.g. hand gesture). Each table 602 may contain multiple elements 608 (e.g. table rows). Each element may include inputs 604 and outputs 606. Inputs 604 may include processed field signals, here denoted as comprising a set of beams. Output 606 may include multiple finger positions. Each finger position may be encoded by linear position (e.g. x, y, and z coordinates), angular position, or any other coordinate system. Tables 602 may have finite resolution, where resolution may be considered as a difference between the outputs 606 of two minimally-separated (e.g. adjacent) elements. The resolution between elements may be limited due to a limited total number of elements 608 available to map the finger position space. The total number of elements 608 may be limited by the finite storage space available on a processor 616, or may be otherwise limited. To allow for a higher-resolution estimate of the output 606, the process of reading from the subdivision database may include interpolation (e.g. linear interpolation). Interpolation is generally a means to produce a higher-resolution output from a lower-resolution table by inferring new outputs which are between the available outputs. A linear interpolation process may use an equation such as the following:

$$y = y_1 + (x - x_1)\frac{y_2 - y_1}{x_2 - x_1}$$

Where x is a desired location, y is an unknown value at x, and $(x_1, y_1)$ and $(x_2, y_2)$ are known location-value pairs adjacent to desired location x.

A subdivision database 600 may be constructed by acquiring a mapping relationship between information of a finger position and speed vs. a received voltage (e.g. EMF information). A subdivision database 600 may be constructed using training data which may also be used to train a neural network, by comparing a large amount of known hand position data (e.g. generated by an optical capture motion tracking device) paired with a received EMF (e.g. as received by a motion capture device simultaneous to the optical motion capture). A subdivision database 600 may be pre-stored on a motion capture device processor (e.g. 516). A subdivision database 600 may be divided according different gesture states, each of which may have a particular set of mapping function (e.g. f1, f2) between a processed received EMF (e.g. beam1, beam2) and a finger position (e.g. x, y, z). In addition to information on a finger position (e.g. location in x, y, and z), a subdivision database 600 may contain information on a finger speed (e.g. velocity in x, y, z).

A mapping relationship between the information of finger position and speed vs. received voltage (e.g. EMF information) may include an interpolation function (e.g. linear interpolation). An interpolation function may be used to fit and cover a range of possible finger motion positions. Position information across multiple times may be compared over time (e.g. differentiated) to obtain speed information of the fingers.

Returning to FIG. 5, a processor 516 may perform an additional operation on the finger position 546 data, which may be a differentiation 548 operation. a processor 516 may consider a current finger position 546 and one or more previous finger positions to estimate a finger velocity 550. A differentiation 548 may be performed by computing the spatial distance between a previous finger position and a current finger position 546, and dividing this distance by the difference between the corresponding previous time and current time. The finger position may be considered as a linear position, angular position, or other coordinate position. A differentiation 548 may consider two position/time pairs, or may consider more than two position/time pairs.

Figure 7:
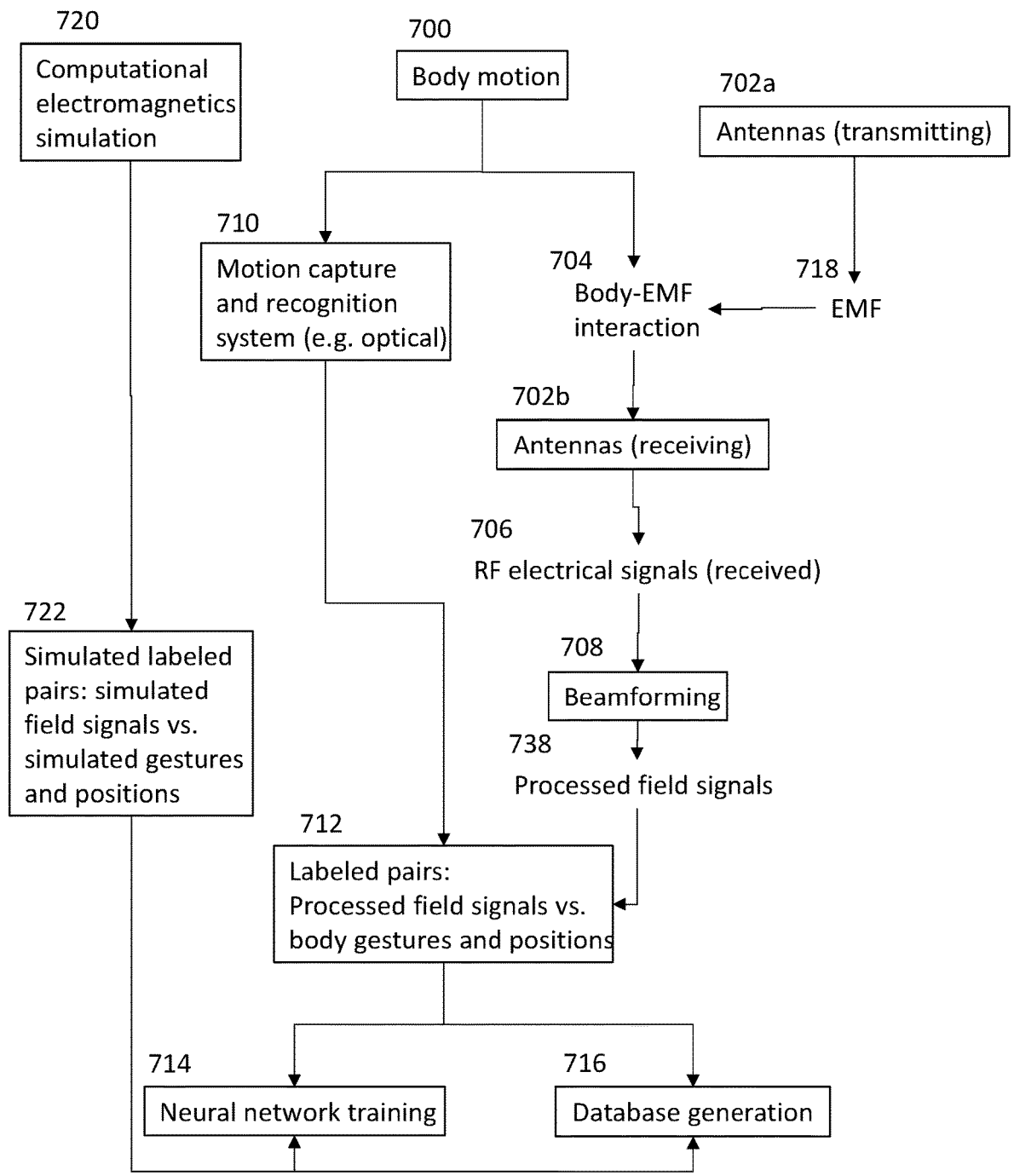
FIG. 7 is an illustrative process flow for a method of generating labeled pair data for training or otherwise building a device for tracking motion of a human hand in accordance with an embodiment of the present invention.

FIG. 7A diagrams a process for generating labeled pair data 712, which may comprise processed field signals 738 (e.g 538 in FIG. 5) paired with information on a corresponding body parameters (e.g. gesture, finger position, finger speed). Labeled pair data 712 may be used for neural network training 714 (e.g. 540 in FIG. 5) and may be used to build a subdivision database 716 (e.g. 544 in FIG. 5). Generating labeled paired data 712 may involve simultaneous use of a motion capture device (e.g. 100 in FIG. 1) and a separate motion recognition device (e.g. an optical motion capture and recognition system).The motion capture device and the motion recognition device may observe the same body motion 700 (e.g. hand motion), which may include multiple motions through a range of behaviors and environments. During a body motion 700, a wearable near-field motion capture system (e.g. 100 in FIG. 1) may be worn and may emit a near-field EMF 718 from one or more transmitting antennas 702a. The near-field EMF 718 may have an interaction 704 with the body motion 700, modifying the EMF 718. The EMF 718 after modification 704 may be sensed by a receiver antenna 702a component of a motion-capture system (e.g. 100 in FIG. 1). The received RF electrical signals 706 may be processed to yield a more useful signal. One example of this processing is beamforming 708, which yields spatial information from the phase and amplitude of received RF electrical signals 706. Alongside the motion capture system (e.g. 100 in FIG. 1), the body motion 700 may also be recognized by a motion recognition system 710 (e.g. an optical motion capture and recognition system). The motion recognition system 710 may be any form of motion recognition (e.g. optical recording with manual labeling of gestures and positions). The motion recognition system 710 produces labels for both a body gesture and a body position over time. The labels produced by the motion recognition system 710 over time may be paired with the signals produced by the beamforming 708. Pairing the labels and signals produces a data set of labeled pairs 712. Within the labeled pairs 712, each beam signal has a label denoting the corresponding body gesture and position.

The labeled pairs 712 may form a basis for training a gesture recognition neural network 714. An example process of network training and an example network architecture are provided in later sections. Additionally, the labeled pairs 712 may be used to populate a database 716 containing labeled pairs (e.g. processed field signals and finger positions). A database 716 may be subdivided according to the gesture. This subdivision of the database 716 may allow for a smaller search space when matching a processed field signal pattern to a finger position, which may reduce ambiguity.

In addition to performing neural network training 714 and database generation 716 using labeled pairs 712 (comprised of data from motion capture 710 and processed field signals 738), neural network training 714 and database generation 716 may additionally use simulated labeled pairs 722. Simulated labeled pairs 722 may be generated by computational electromagnetic simulation 720 (CEM). CEM 720 may comprise numerical computer-based methods of modeling EMFs and generating predicted fields, by computing Maxwell's equations across a modeled geometry and over time. Example CEM 720 methods including finite-difference time domain, method of moments, beam propagation method, Fourier methods, and others. A CEM 720 simulation may comprise a modeled system, with the modeled system comprising antennas (e.g. 702), body elements (e.g. arm, hand, fingers), and environmental elements (e.g. walls, tables). Each element of the modeled system has assigned electromagnetic properties. In an example CEM 720 model, simulated transmitting antennas (e.g. 720a) may be supplied with simulated RF electrical signals (e.g. 524 in FIG. 5). The CEM 720 model may compute Maxwell's equations across the simulated transmitting antenna (e.g. 702a), simulated body elements, and simulated environmental elements to determine a simulated EMF. The simulated EMF may include receptive fields of simulated receiving antennas (e.g. 702b). The CEM 720 model may compute simulated received electrical signals (e.g. 526 in FIG. 5) given the simulated EMF. The CEM 720 model may include many different positions of the simulated body elements and environmental elements, and in this manner the CEM 720 model may be used to generate simulated labeled pair 722 data across a wide range of gestures, positions, and conditions. The CEM 720 model may include motion of the simulated body elements or the simulated environmental elements. The CEM 720 model may include varying sizes and shapes of the simulated body elements, in order to generate simulated labeled pairs 722 which may be applicable to a wide range of users. In a CEM 720 model the gesture and position of the hand and fingers is known before the simulated EMF is generated, which allows for pairing of the known simulated gesture and position with the simulated received signals.

Figure 8:
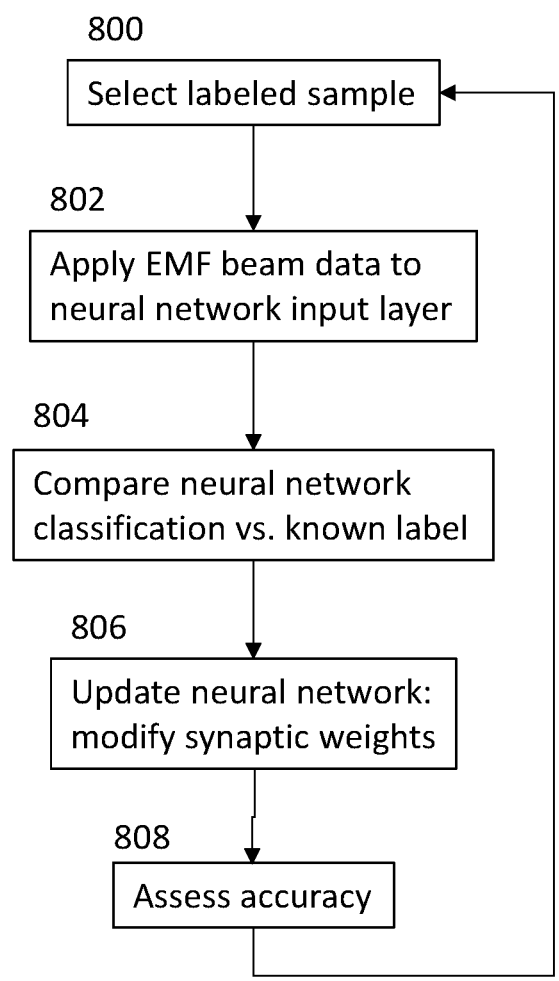
FIG. 8 is an illustrative process flow for a method of training a gesture recognition neural network for a device for tracking motion of a human hand in accordance with an embodiment of the present invention.

FIG. 8 diagrams a process for training a neural network. A training cycle may begin by choosing a particular sample 800 from among a set of labeled pairs (e.g. 712 of FIG. 7) or simulated labeled pairs (e.g. 722 of FIG. 7). The processed field signal data may then be applied to the input layer of a neural network 802. The neural network then operates on this input data and produces a result which may be the neural network estimated classification of the input data. In a subsequent step, the neural network estimated classification is compared 804 to the true classification label of the paired sample. This comparison determines if the neural network is correct or incorrect for this training cycle. In either case, the synaptic weights which comprise the neural network may then be updated 806 to reflect this training. In an example, if the network classification correctly matches the true label, then active synapses may be strengthened; if the network classification is incorrect, then active synapses may be weakened. Lastly, on some training cycles, the overall accuracy of the network may be assessed 808. The assessment of accuracy 808 may not be performed on every training cycle, but may instead be performed after a given number of training cycles. The accuracy assessment 808 may use a number of labeled pairs rather than just a single labeled pair, and may use labeled pairs which have not been part of the training set in order to avoid over-fitting the neural network. An accuracy assessment 808 may be used to determine if the network requires further training.

A motion tracking device may include a calibration function. A calibration function may modify input signals (e.g. processed field signals 538 in FIG. 5), or may modify output signals (e.g. finger position 546 in FIG. 5), or may modify internal parameters (e.g. synaptic weights within a neural network 540 in FIG. 5), or may modify other aspects of a motion capture device. By modifying these aspects, a calibration may serve to make a motion capture device more accurate for a particular user given that user's particular body geometry. A calibration procedure may comprise a user performing a scripted set of gestures and finger motions with a motion capture device attached. The motion capture device may then use the signals generated by this known scripted set of gestures and finger motions to modify aspects of the motion capture device (e.g. to modify input signals, output signals, neural network parameters, or other aspects). A calibration procedure may be informed by a calibration procedure. A calibration procedure may be performed by a user when the user is first using a motion capture device, and may be thereafter stored by the motion capture device. Alternately, a calibration procedure may be performed each time a device is attached to a user. A calibration procedure may make use of a pre-determined database of calibration relationships stored on a motion capture device. A database of calibration relationships may be created by a process of measuring hand positions and motion capture device output signals across a set of users, wherein the set of users may comprise user having a range of hand sizes and shapes (e.g. left, right, large, small, male, female, adult, child).

In an alternate embodiment, a beacon ring may be configured to be worn on a finger of a hand of a user. A beacon ring may include a structure configured to provide a unique or identifiable EMF interaction (e.g. a resonant circuit, a passive resonator, a nonlinear circuit). A beacon ring may be a passive device or an active device. A beacon ring may provide additional information to aid a pattern recognition calculation (e.g. a neural network). A beacon ring may provide additional information by distorting an EMF in an identifiable way, which may aid later processing (e.g. beamforming) in determining the beacon ring location in space. A known ring location may provide additional information which may aid later processing (e.g. a neural network) for estimating the position of the hand.

What is claimed is:

1. A hand motion tracking device, comprising:
  a band configured to attach to a human wrist;
  a plurality of near-field antennas disposed on the band; and
  a control unit, electrically connected to the plurality of near-field antennas, comprising:
    a switch,
    a processor,
    a transmitting module,
    a receiving module, and
    a wireless communication module,
    wherein the switch is configured to selectively connect each near-field antenna of the plurality of near-field antennas to a selected one of the transmitting module and the receiving module; and
    wherein the processor is configured to execute instructions for:
      controlling the switch to connect a first subset of the plurality of near-field antennas to the transmitting module and a second subset of the plurality of near-field antennas to the receiving module;
      transmitting, from the transmitting module, transmitted RF signals, wherein the transmitted RF signals are delivered to the first subset of the plurality of near-field antennas;
      receiving, from the receiving module, received RF signals from the second subset of the plurality of near-field antennas, wherein the received RF signals are associated with a frequency, amplitude, and phase information;

digitizing the frequency, the amplitude, and the phase information of the received RF signals to generate digitized frequency, amplitude, and phase information;

applying the digitized frequency, amplitude, and phase information to a neural network to determine an estimated hand gesture wherein the estimated hand gesture comprises an arrangement of a palm and fingers;

applying the digitized frequency, amplitude, and phase information and the estimated hand gesture to a finger position database to determine an estimated position of one or more fingers;

comparing the estimated position of the one or more fingers with one or more previous estimated finger positions to determine an estimated finger velocity; and sending the estimated hand gesture, the estimated position of the one or more fingers, and the estimated finger velocity to the wireless communication module for transmission.

2. The hand motion tracking device of claim 1, wherein the processor is further configured to execute instructions for:

processing the digitized frequency, amplitude, and phase information by a feature extraction method, before applying the digitized frequency, amplitude, and phase information to the neural network.

3. The hand motion tracking device of claim 2, wherein the feature extraction method is comprised of a beamforming method.

4. The hand motion tracking device of claim 1, wherein applying the digitized frequency, amplitude, and phase information and the estimated hand gesture to a finger position database to determine an estimated position of one or more fingers further comprises applying a linear interpolation method.

5. The hand motion tracking device of claim 1, wherein controlling the switch to connect a first subset of one or more of the plurality of near-field antennas to the transmitting module and a second subset of one or more of the plurality of near-field antennas to the receiving module further comprises a time-varying instruction, such that a membership of the first subset and a membership of the second subset are varied over time.

6. The hand motion tracking device of claim 1, further comprising a beacon ring, wherein the beacon ring is configured to attach to a human finger, and wherein the beacon ring modifies the received RF signals.

7. The hand motion tracking device of claim 1, wherein the processor is further configured to execute instructions for:

performing a calibration, wherein the calibration comprises adjusting a one or more internal parameters of the hand motion tracking device to improve an accuracy of the estimated position of the one or more fingers configured for a particular user.

8. A motion tracking device, comprising:
a band configured to attach to a human body;
a plurality of near-field antennas disposed on the band;
a control unit, electrically connected to the plurality of near-field antennas, comprising:
a switch;
a processor;
a transmitting module;
a receiving module; and
a wireless communication module;
wherein the switch is configured to connect each antenna of the plurality of near-field antennas to a selected one of the transmitting module and the receiving module; and
wherein the processor is configured to execute instructions for:

controlling the switch to connect a first subset of one or more of the plurality of near-field antennas to the transmitting module and a second subset of one or more of the plurality of near-field antennas to the receiving module;

transmitting, from the transmitting module, a one or more transmitted RF signals, wherein the transmitted RF signals are delivered to the first subset of near-field antennas, such that the first subset of near-field antennas emits a near-field electromagnetic field (EMF) which is configured to interact with a body part;

receiving, from the receiving module, one or more received RF signals, wherein the one or more received RF signals comprise a frequency, amplitude, and phase information from the second subset of near-field antennas such that the second subset of near-field antennas senses the EMF;

digitizing the frequency, amplitude, and phase information of the one or more received RF signals to generate digitized frequency, amplitude, and phase information;

applying the digitized frequency, amplitude, and phase information to a pattern recognition system to determine an estimated arrangement of a body part;

sending the estimated arrangement of the body part to the wireless communication module for transmission.

9. The motion tracking device of claim 8, wherein the processor is further configured to execute instructions for:

processing the digitized frequency, amplitude, and phase information by a beamforming method, before applying the digitized frequency, amplitude, and phase information to the pattern recognition system.

10. The motion tracking device of claim 8, wherein the pattern recognition system comprises at least a neural network.

11. The motion tracking device of claim 8, wherein the pattern recognition system comprises at least a database.

12. The motion tracking device of claim 8, wherein the processor is further configured to execute instructions for:

comparing the estimated arrangement of the body part with one or more previous estimated body part positions to determine an estimated body part velocity.

13. The motion tracking device of claim 8, further comprising a beacon ring, wherein the beacon ring is configured to attach to a body part, and wherein the beacon ring modifies the EMF.

14. The motion tracking device of claim 8, wherein the processor is further configured to execute instructions for:

performing a calibration, wherein the calibration comprises adjusting a one or more internal parameters of the motion tracking device to improve an accuracy of an estimated finger position configured for a particular user.

* * * * *